(12) United States Patent
Kao

(10) Patent No.: US 6,383,590 B1
(45) Date of Patent: May 7, 2002

(54) TEAR-ALONG STRUCTURE OF A SHEET MATERIAL

(75) Inventor: Cheng-Kang Kao, Taipei (TW)

(73) Assignee: Four Pillars Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 09/545,736

(22) Filed: Apr. 10, 2000

(30) Foreign Application Priority Data

Nov. 24, 1999 (TW) ........................................ 88220011 U

(51) Int. Cl.$^7$ ................................................. B32B 1/08
(52) U.S. Cl. .................... 428/36.91; 428/43; 242/613.3; 242/613.2; 242/160.1
(58) Field of Search ....................... 428/43, 36.9, 36.91; 242/613.2, 613.3, 160.1, 613.1; 206/411, 390

(56) References Cited

U.S. PATENT DOCUMENTS 401,233 A * 4/1889 Wheeler ...................... 206/390

* cited by examiner

Primary Examiner—Alexander S. Thomas

(57) ABSTRACT

The present invention relates to a tear-along structure of a sheet material, comprising a polygonal core lining, a roll of membrane substrate of the sheet material, wrapped around the polygonal core lining, and a slit cut at least one edge of the roll corresponding to a crest line of each corner of the core lining and toward said core lining. The slit is cut deeply into said core lining, wherein the substrate can be a normal membrane or with adhesive back tape, and then wrapped as a polygon or a multilateral shape.

4 Claims, 3 Drawing Sheets

TEAR-ALONG STRUCTURE OF A SHEET MATERIAL

FILED OF THE INVENTION

The present invention relates to a tear-along structure of a sheet material, and particularly to a tear-along structure of a sheet material suitable for a polygon roll design of an adhesive tape.

DESCRIPTION OF THE RELATED ART

The conventional long yard membranes are all rolled up in a cylindrical shape, such as a roll of toilet paper. In order to achieve the easy tear feature during operation, the pressed veins or hole-piercing (i.e. punched as the dotted lines) at predetermined length's positions are utilized. Particularly, in the application of the adhesive tape, for example, the Taiwanese Patent Application No.7224090 filed on Jun. 21, 1983 and entitled "Point-cut typed adhesive plastic tape", a point-cut typed OPP (oriented polypropylene) adhesive tape has been disclosed, which is characterized by piercing hole on this adhesive tape. Furthermore, e.g. in the Taiwanese Patent Application No. 77211389 filed on Dec. 5, 1988 and entitled "Traverse type of new patterned adhesive tape", a design of "Traverse type of new patterned adhesive tape" is disclosed, which is set with a gradually layered guide angle at the side edge of the main body of an adhesive tape and applied the partial back glue to said adhesive tape. And part of the unglued area near the side of the gradually layered guide angle is reserved for the pulling up position of adhesive tape. In addition, the cutting groove is set on the surface of the adhesive tape, and a strip shaped adhesive tape is formed between two cutting grooves.

In recent years, an adhesive tape with minute orifice structure produced by a minute processing technology has been developed to provide a product with the feature of easy tear in every direction. However, this kind of adhesive tape is difficult to bring about an ordered slit while tearing due to the limpness of adhesive tape itself.

SUMMARY OF THE INVENTION

The object of the present invention is to provide a tear-along structure of a sheet material suitable for a polygon roll design of the adhesive tape which is characterized in that:

a membrane substrate is wrapped around a polygonal core lining, and a slit is cut into at least one edge corresponding to a crest line of each corner of the core lining. The slit is cut deeply into the said core lining.

According to the present invention, the substrate is torn from the slit; and with the crest line formed by a curvature of the substrate at the corner, the substrate is leaned against this crest line and torn along this crest line orderly.

BRIEF DESCRIPTION OF THE DRAWINGS

The details of the embodiments of the present invention will be described in the following appended drawings and descriptions. The other features, objects and advantages of the present invention will also be apparent in the descriptions, drawings and claims; wherein:

DESCRIPTION OF THE PREFERRED EMBODIMENT

Figure 2:
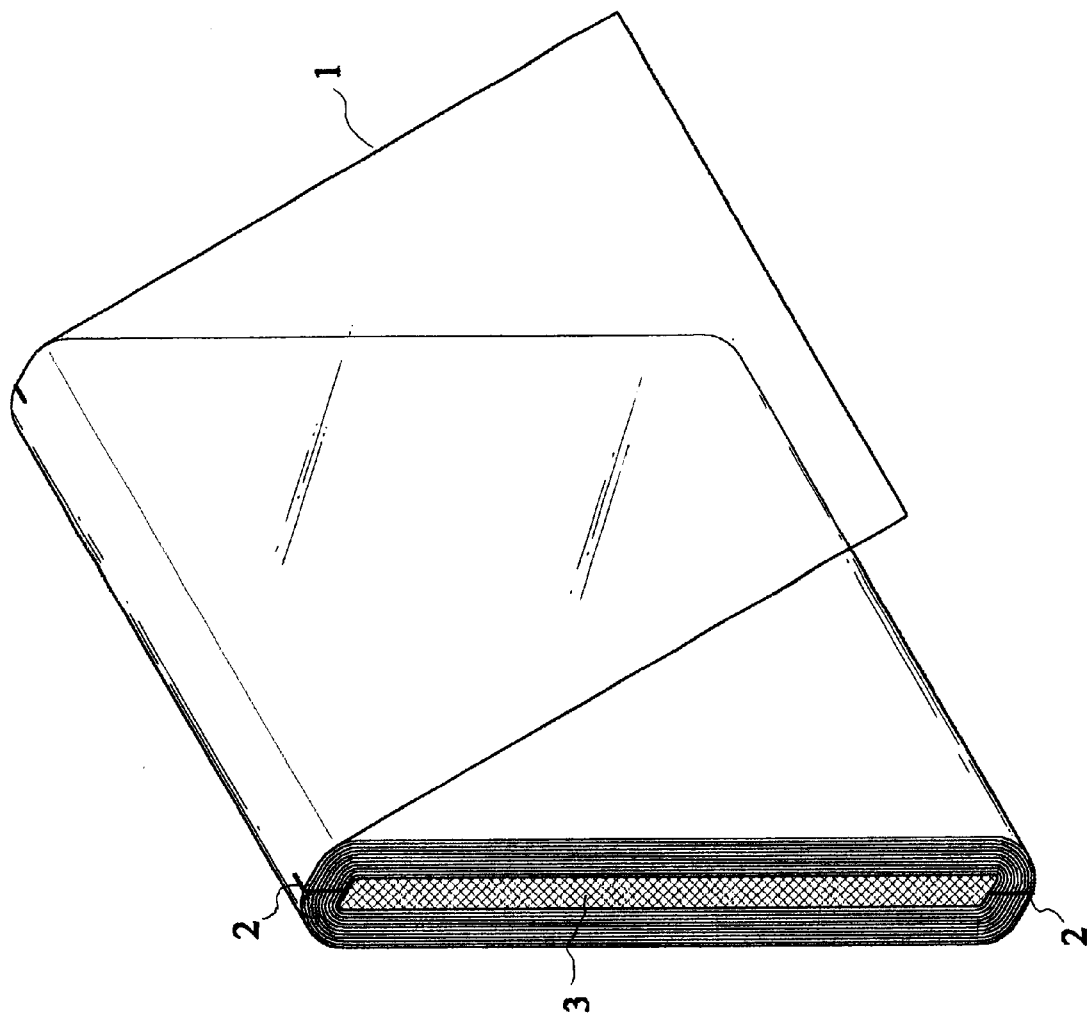
FIG. 2 is a side view describing a flat shaped tear-along structure shown in FIG. 1.
Figure 1:
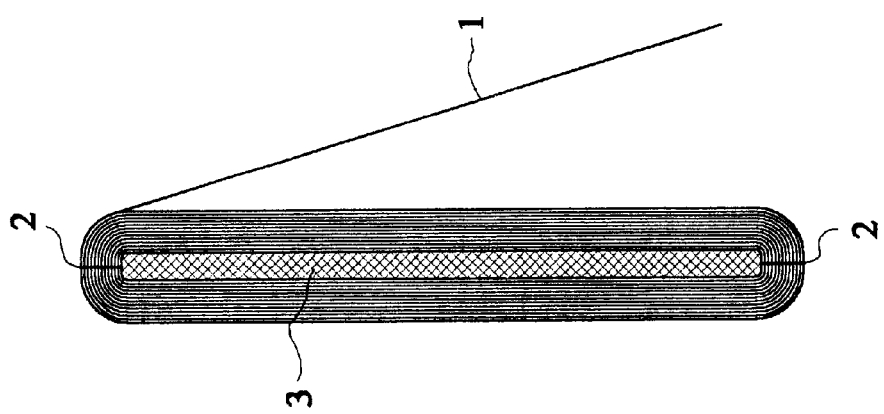
FIG. 1 is a schematic view describing a flat shaped tear-along structure according to an embodiment of the present invention.

The diagram shown in FIG. 1 describes a flat-shaped embodiment according to the present invention, i.e. two angle or two side shaped tear-along structure. A conventional substrate of the tear-along structure is a kind of paper, non-woven fabric or thermoplastic membranes such as polypropylene (PP), polyester (PET) or the like materials and wrapped around a core lining 3. A lease of a slit is deepened into and toward the surface of the core lining 3 of the tear-along structure. The tear-along structure can tear the substrate from the slice as shown in FIG. 2 along the crest line direction of the tear-along structure at one of the two turning corners of right side or left side. Those slits 2 are the small cutting slits of edges of two sides on said two angular crest lines.

Figure 4:
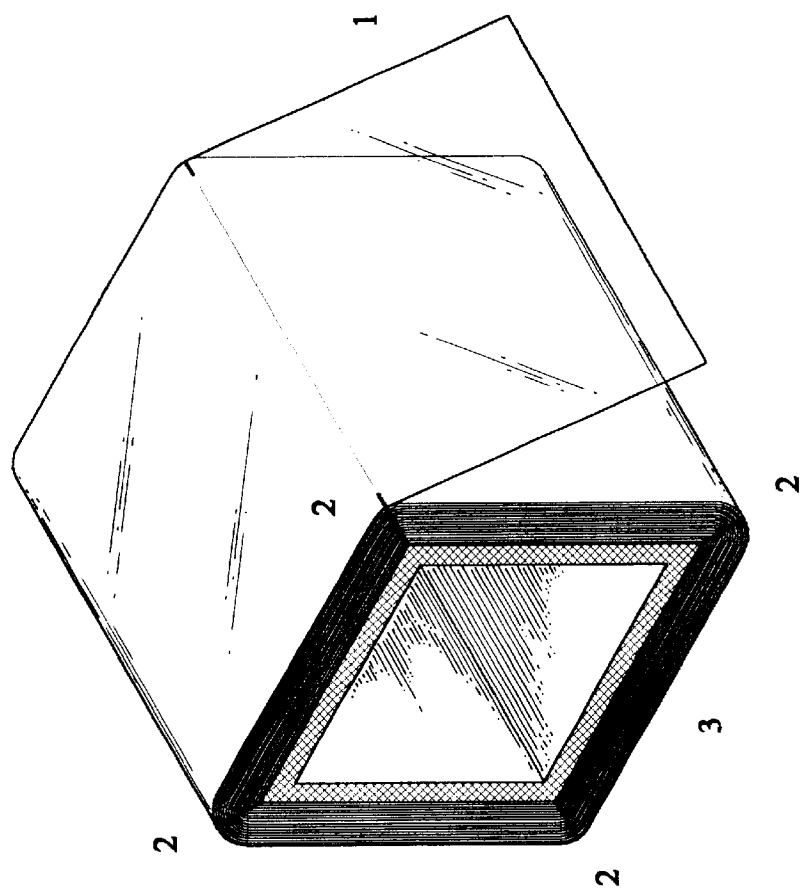
FIG. 4 is a schematic view describing a rectangular tear-along structure according to a further embodiment of the present invention.
Figure 3:
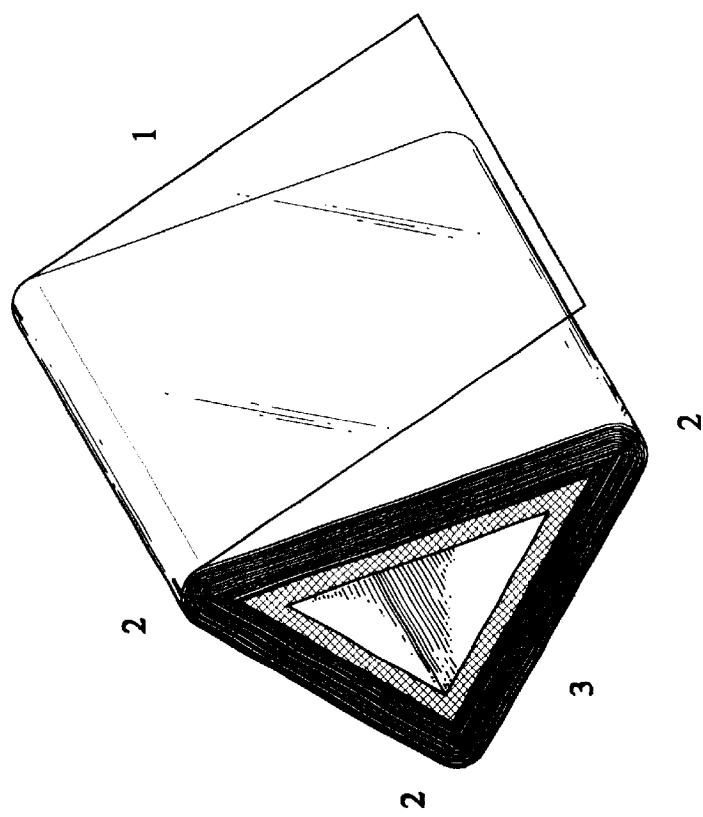
FIG. 3 is a schematic view describing a triangular tear-along structure according to another embodiment of the present invention.
Figure 6:
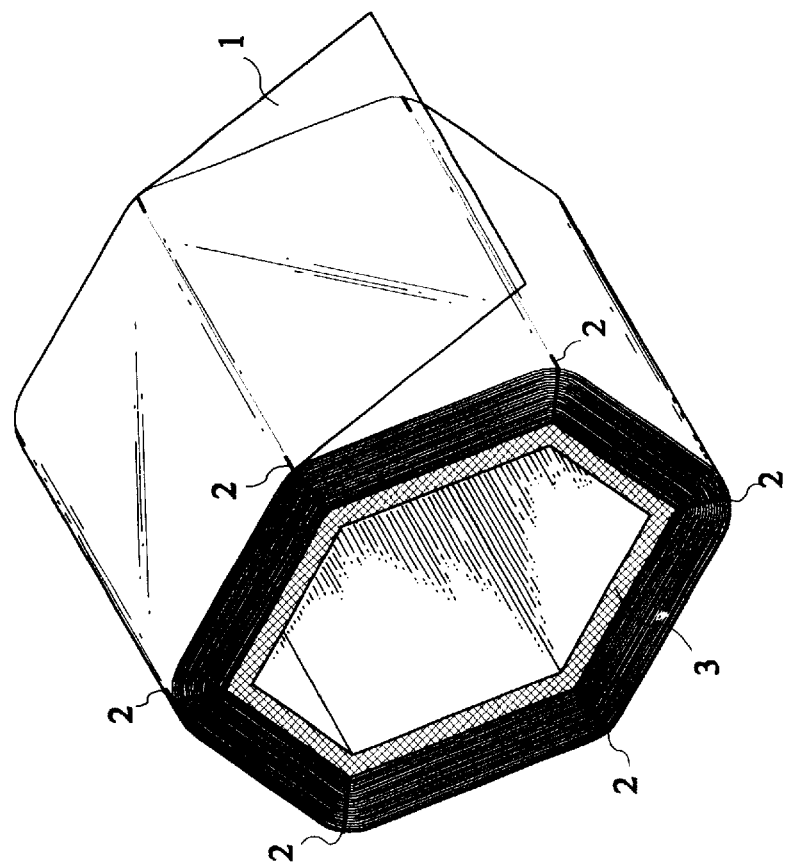
FIG. 6 is a schematic view describing a hexagonal tear-along structure according to a still further embodiment of the present invention.
Figure 5:
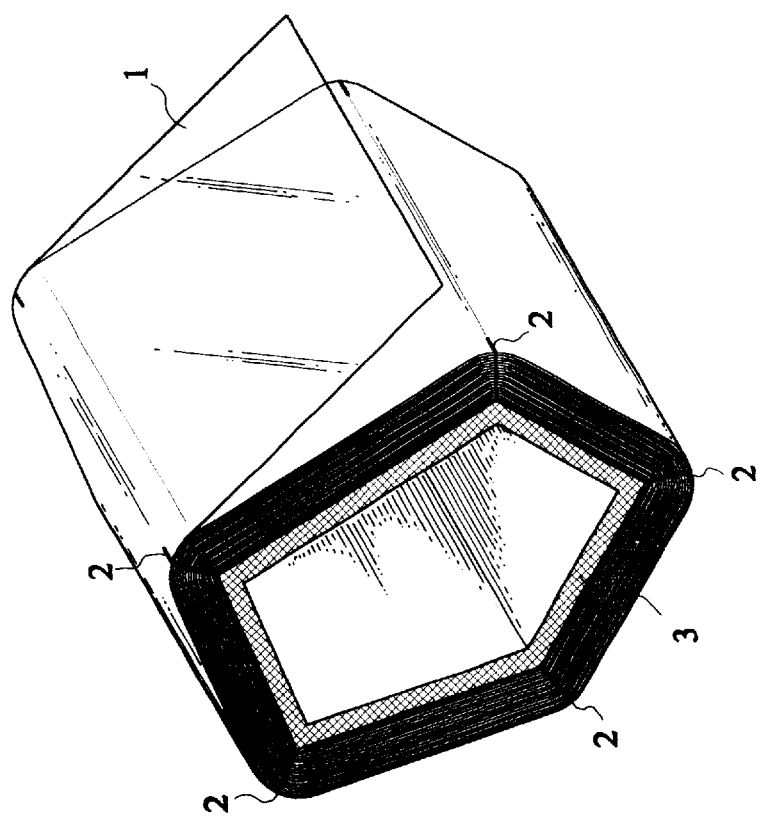
FIG. 5 is a schematic view describing a pentagonal tear-along structure according to a still embodiment of the present invention.

In FIG. 3, another triangular embodiment according the preset invention is described, i.e. the schematic view of the triangular tear-along structure, wherein a slit 2 is cut on the crest line of each side of three turning corners of the triangular structure. The slit 2 is also deepened into and toward the surface of the core lining 3 of the tear-along structure. In FIG. 4, a further rectangular embodiment according the preset invention is described, i.e. the schematic view of the rectangular tear-along structure, wherein a slit 2 is cut on the crest line of each side of four turning corners of the rectangular structure. The slit 2 is also deepened into and toward the surface of the core lining 3 of the tear-along structure. In FIG. 5, still a pentagonal embodiment according the present invention is described, i.e. the schematic view of the pentagonal tear-along structure, wherein a slit 2 is cut on the crest line of each side of five turning corners of the pentagonal structure. The slit 2 is also deepened into and toward the surface of the core lining 3 of the tear-along structure. And in FIG. 6, a further hexagonal embodiment according the present invention is described, i.e. the schematic view of the hexagonal tear-along structure, wherein a slit 2 is cut on the crest line of each side of six turning corners of the hexagonal structure. The slit 2 is also deepened into and toward the surface of the core lining 3 of the tear-along structure. As this, the present invention will be suitable for the usage of the polygonal roll paper or glue roll (such as adhesive tape), wherein these polygons, i.e. the side length of multilateral shapes can further be utilized for setting the required dimensions.

It will be understood that various modifications and changes of the present invention can be allowed. For example, the present invention can also be applied to a cylindrical tear-along structure. Furthermore, the substrate can be a normal membrane or with adhesive back tape, and then wrapped as a polygon or a multilateral shape. However, the present invention intends to cover all the equivalents of the appended claims without departing from the spirit and scope of the present invention.

What is claimed is:

1. A sheet material roll having a tear-along structure comprising:

a core lining having a polygon shape;

a membrane substrate of sheet material wrapped around said polygon shaped core lining forming said sheet material roll and having a crest line at each corner of the polygon shape; and a slit formed along an edge of said sheet material roll extending through said sheet material to at least said core lining, said slit corresponding to at least one crest line of said roll.

2. The sheet material roll having a tear-along structure as defined in claim 1, wherein the polygon shape is triangular, rectangular, pentagonal or hexagonal.

3. The sheet material roll having a tear-along structure as defined in claim 1, wherein said membrane substrate of sheet material is paper, non-woven fabric or thermoplastic membranes.

4. The sheet material roll having a tear-along structure as defined in claim 1, wherein said membrane substrate is provided with a glue backing.

* * * * *